US011719026B2

(12) United States Patent
Tsorng et al.

(10) Patent No.: US 11,719,026 B2
(45) Date of Patent: Aug. 8, 2023

(54) INTEGRATED LATCH MECHANISM FOR SECURING RACKMOUNT EQUIPMENT IN A CHASSIS

(71) Applicant: QUANTA COMPUTER INC., Taoyuan (TW)

(72) Inventors: Yaw-Tzorng Tsorng, Taoyuan (TW); Yao-Long Lin, Taoyuan (TW); Chun Chang, Taoyuan (TW); You-Jin Liu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 163 days.

(21) Appl. No.: 16/823,039

(22) Filed: Mar. 18, 2020

(65) Prior Publication Data

US 2021/0198926 A1 Jul. 1, 2021

Related U.S. Application Data

(60) Provisional application No. 62/954,373, filed on Dec. 27, 2019.

(51) Int. Cl.
*E05C 1/12* (2006.01)
*E05B 13/00* (2006.01)
*G06F 1/18* (2006.01)

(52) U.S. Cl.
CPC .............. *E05C 1/12* (2013.01); *E05B 13/002* (2013.01); *G06F 1/183* (2013.01); *E05Y 2900/606* (2013.01)

(58) Field of Classification Search
CPC ........ E05B 65/02; E05B 65/006; E05B 17/20; E05B 17/2007; E05B 17/203; E05B 17/2038; E05B 17/2049; E05B 17/2057; E05B 13/002; E05C 1/00; E05C 1/004; E05C 1/08; E05C 1/085; E05C 1/12;
(Continued)

(56) References Cited

U.S. PATENT DOCUMENTS 4,683,736 A * 8/1987 Weinerman ............... E05B 9/08
248/27.3
5,793,614 A * 8/1998 Tollbom ............... H05K 7/1409
361/801
(Continued)

FOREIGN PATENT DOCUMENTS

GB 2292173 A * 2/1996 ............... E05B 5/00

*Primary Examiner* — Christine M Mills
*Assistant Examiner* — Peter H Watson
(74) *Attorney, Agent, or Firm* — Nixon Peabody LLP (57) ABSTRACT

An integrated latch apparatus for a securing and releasing computer equipment from a chassis includes a support bracket, a rotating shaft, a sliding plate having a latching extension, and a handle having a rotating end. The handle is secured at the rotating end to the support bracket about the rotating shaft. The rotating end of the handle includes nudging extensions. A torsion spring is disposed on the rotating shaft such that the torsion spring biases the support bracket against the handle such that the handle is in an open position when the torsion spring is extended towards an equilibrium state and in a closed position when the torsion spring is biased toward a fully compressed state. The nudging extensions engage and laterally move a sliding plate when the handle is rotated between the open position and the closed position.

21 Claims, 9 Drawing Sheets

(58) Field of Classification Search
CPC ........ E05C 1/14; E05C 1/145; Y10T 292/096;
Y10T 292/0969; Y10T 292/0994; Y10T
292/102; Y10T 292/202; Y10S 292/11;
Y10S 292/31; G06F 1/181–184; G06F
1/185–186
USPC .......................................... 361/726, 759, 801
See application file for complete search history.

(56) References Cited

U.S. PATENT DOCUMENTS

| | | | | |
|---|---|---|---|---|
| 5,927,773 | A * | 7/1999 | Larsen | E05C 1/145 292/DIG. 31 |
| 6,109,669 | A * | 8/2000 | Pinkow | E05C 1/145 292/175 |
| 2002/0163205 | A1* | 11/2002 | Sekulovic | E05C 3/162 292/163 |
| 2004/0113432 | A1* | 6/2004 | Hall | E05C 1/145 292/66 |
| 2005/0093304 | A1* | 5/2005 | Figge | B60R 5/04 292/173 |
| 2005/0140150 | A1* | 6/2005 | Hall | E05C 1/145 292/336.3 |
| 2011/0068588 | A1* | 3/2011 | Kopylov | E05C 19/14 292/200 |
| 2011/0095153 | A1* | 4/2011 | Zhang | G11B 33/124 248/309.1 |
| 2012/0250232 | A1* | 10/2012 | Li | F16M 11/10 361/679.01 |
| 2016/0150659 | A1* | 5/2016 | Chen | E05C 1/145 312/223.2 |
| 2016/0259381 | A1* | 9/2016 | Geng | G06F 1/182 |
| 2017/0260782 | A1* | 9/2017 | Kim | E05B 13/002 |
| 2021/0267075 | A1* | 8/2021 | Lu | H05K 7/1487 |

* cited by examiner

FIG. 10

INTEGRATED LATCH MECHANISM FOR SECURING RACKMOUNT EQUIPMENT IN A CHASSIS

CROSS-REFERENCE TO RELATED APPLICATION

This application claims priority under 35 U.S.C. § 119 to U.S. Provisional Application No. 62/954,373, entitled "COMPACT NODE HANDLE WITH AUTOMATIC LATCH", filed on Dec. 27, 2019. The contents of that application are hereby incorporated by reference in their entirety.

FIELD OF THE INVENTION

The present invention relates to securing rackmounted equipment in a chassis. More specifically, the present invention relates to an integrated latch mechanism for securing and releasing rackmount equipment in a chassis.

BACKGROUND

Rackmounted computing devices, such as rackmounted servers, are employed in large numbers for high demand applications such as network based systems or data centers. Rackmounted equipment can include multiple hardware components that can be swapped out. For example, when upgrading hardware components of a server, such as storage or memory devices, the hardware component can be removed and replaced with higher capacity or higher speed components. Various cards of the server can be replaced with various other cards, etc.

Rackmounted computing devices, such as those found in a server system, can support the swapping of the components. For ease in swapping rackmounted components, there is a need for a computing system that is amenable to accepting and releasing rackmounted equipment on demand, especially at data centers that may be upgrading their hardware. The process of removing and reinstalling the rackmounted equipment can become time consuming for a technician. Accordingly, the present disclosure is directed to reducing time required in removing and installing rackmounted equipment.

SUMMARY

According to one embodiment, an integrated latch apparatus for a securing and releasing computer equipment from a chassis comprises a support bracket that includes a first lateral structure and a rotating shaft secured to the support bracket. The apparatus further includes a sliding plate having a latching extension, and a handle having a second lateral structure at a rotating end of the handle. The handle is secured at the rotating end to the support bracket to the rotating shaft. The rotating end of the handle includes one or more nudging extensions. A torsion spring is disposed on the rotating shaft such that the torsion spring biases the first lateral structure of the support bracket against the second lateral structure of the handle, such that the handle is in an open position when the torsion spring is extended toward an equilibrium state and in a closed position when the torsion spring is biased toward a fully compressed state. The one or more nudging extensions of the handle engage and laterally move the sliding plate when the handle is rotated from the open position to the closed position, thereby moving the latching extension away from the support bracket to engage the chassis as the handle is rotated to the closed position.

A further aspect of the embodiment includes the one or more nudging extensions of the handle engaging and laterally moving the sliding plate in an opposite direction toward the support bracket when the handle is rotated from the closed position to the open position, thereby disengaging the latching extension from the chassis as the handle is rotated to the open position. Another aspect of the embodiment includes the torsion spring being a double torsion spring. Yet another aspect includes a mounting bracket secured to the support bracket. Yet another aspect includes the sliding plate being disposed between the supporting bracket and the mounting bracket. Yet another aspect includes the mounting bracket being mounted to a front cover of the computer equipment. In yet another aspect, when the handle is positioned in the open position, the handle is operable for sliding the computer equipment in and out of a chassis disposed in a rack. In yet another aspect, the handle includes at least two nudging extensions. In yet another aspect, the first lateral structure extends between a first wing structure and a second wing structure disposed on the support bracket. In yet another aspect, the first wing structure and second wing structure are both perpendicular to the first lateral structure. In yet another aspect, the rotating shaft has a first end and a second end with the first end secured to the first wing structure and the second end secured to the second wing structure.

A farther aspect of the embodiment includes the handle having two elongated sides with the second lateral structure extending between the two elongated sides. Another aspect includes the one or more nudging extensions engaging the sliding plate through one or more corresponding slots in the sliding plate. Yet another aspect includes cine or more compression springs for laterally biasing the sliding plate and latching extension away from the support bracket. Yet another aspect includes a spring-loaded shaft secured to the support bracket for engaging a hole in the handle when the handle is in the closed position, thereby locking the handle in the closed position. Yet another aspect includes the spring-loaded shall being configured to disengage with the hole in the handle when the spring-loaded shaft is compressed, thereby unlocking and allowing the handle to be rotated to an open position. Yet another aspect includes the handle being generally parallel to the sliding plate when the handle is in the closed position. Yet another aspect includes the handle being at least near perpendicular to the sliding plate when the handle is in the open position. Yet another aspect includes the latching extension being generally perpendicular to the sliding plate.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of embodiments together with reference to the accompanying drawings.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The various embodiments are described with reference to the attached figures, were like reference numerals are used throughout the figures to designate similar or equivalent, elements. The figures are not drawn to scale, and they are provided merely to illustrate the instant invention. It should be understood that numerous specific details, relationships, and methods are set forth to provide a full understanding. One having ordinary skill in the relevant art, however, will readily recognize that the various embodiments can be practiced without one or more of the specific details, or with other methods. In other instances, well-known structures or operations are not shown in detail to avoid obscuring certain aspects of the various embodiments. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately" and the like, can be used herein to mean "at," "near," or "nearly at," or "within 3-5% of," or "within acceptable manufacturing tolerances," or any logical combination thereof for example.

With regards to the present disclosure, the terms "computing device" or "computing system" or "computer system" refer to any electronically-powered or battery-powered equipment that has hardware, software, and/or firmware components, where the software and/or firmware components can be configured for operating features on the device. The term "operating environment" can refer to any operating system or environment that functions to allow software to run on a computer system.

It would be desirable to increase the efficiency and ease in swapping rackmounted computer components. Such efficiency can desirably be achieved through an integrated latch and handle mechanism secured to the computer equipment for securing and releasing the rackmounted equipment with a single action by a technician.

Figure 1:
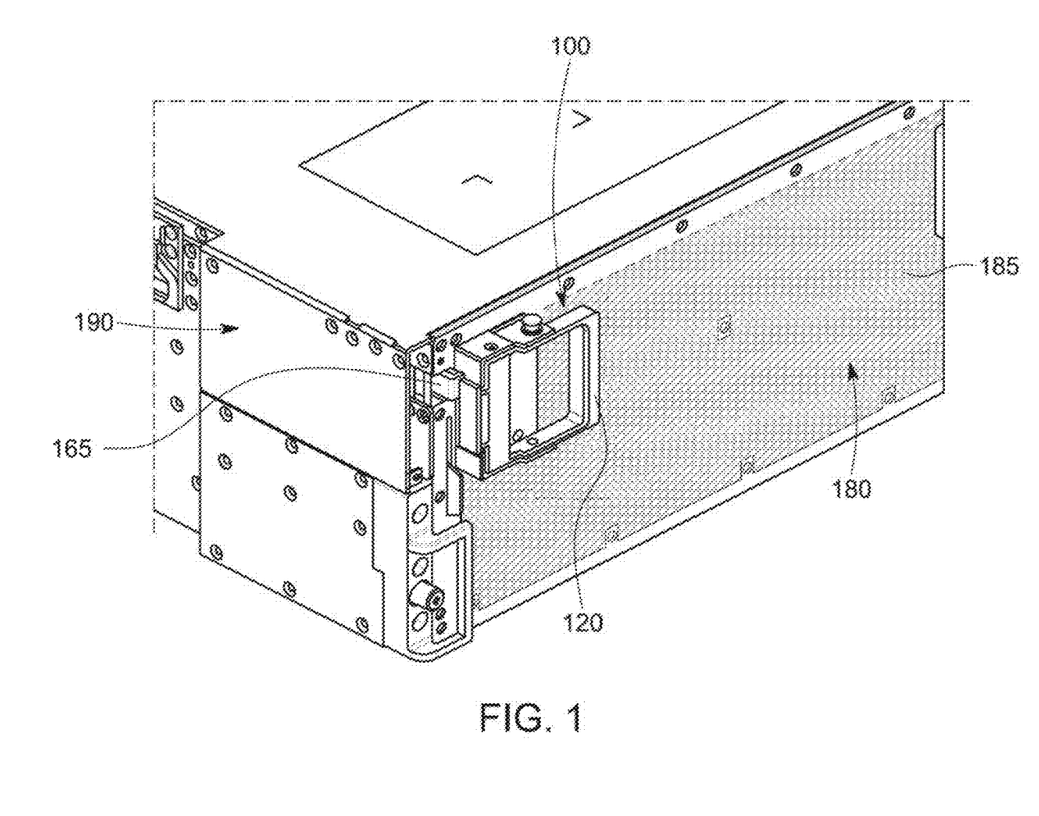
FIG. 1 is a perspective view of an integrated latch mechanism for securing rackmounted equipment to a chassis, according to some implementations of the present disclosure.

Turning now to FIG. 1, a perspective view of an integrated latch mechanism 100 is depicted for securing computer equipment 180, such as rackmounted equipment, to a chassis 190. The integrated latch mechanism 100 is secured to the computer equipment 180, such as directly above a vented top cover 185 of the computer equipment 180. A handle 120 of the integrated latch mechanism 100 is depicted in an exemplary closed position, where the computer equipment 180 is secured to the chassis 190 via a latch extension 165 that is integrally a part of the latch mechanism 100 and directly engages the chassis 190.

Figure 2:
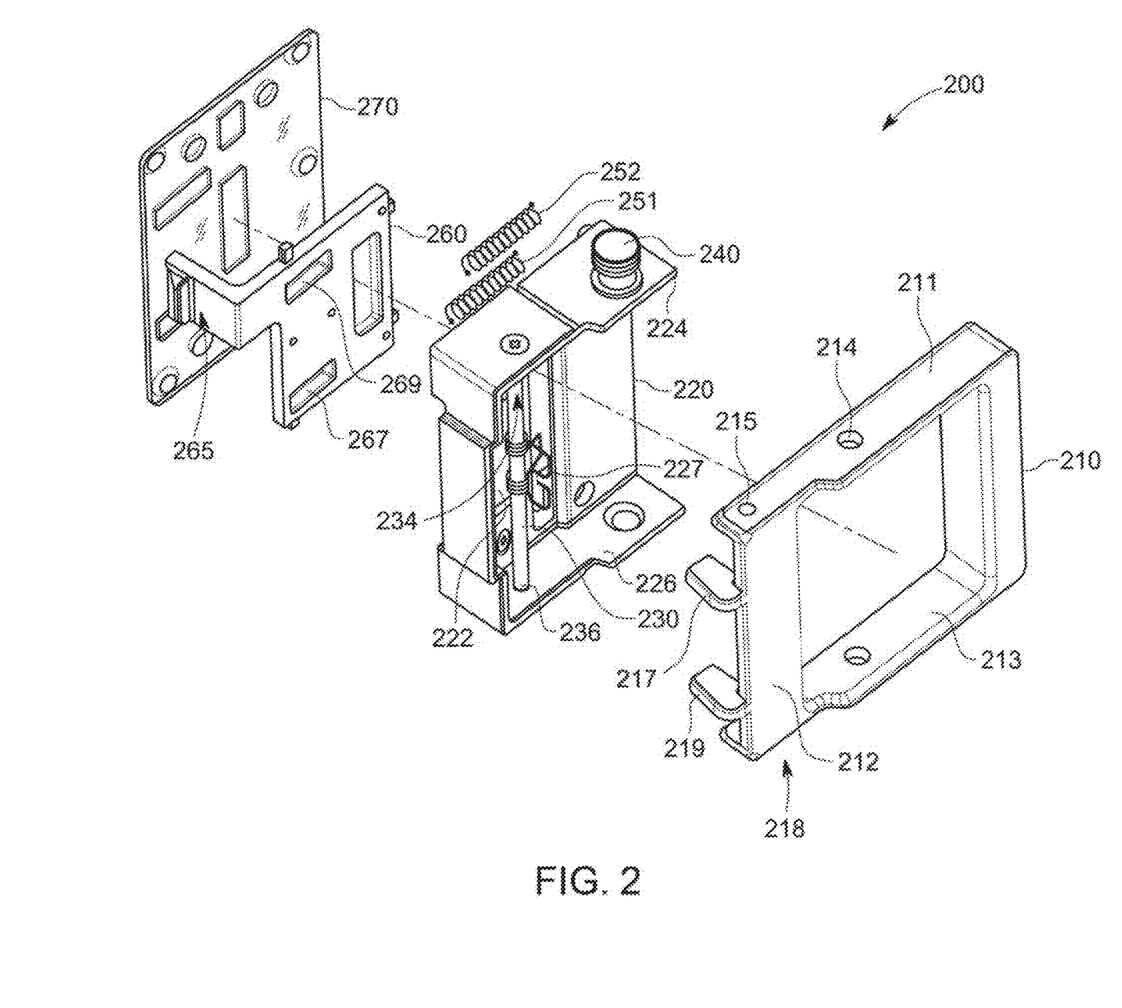
FIG. 2 is an exploded perspective view of an integrated latch mechanism, according to some implementation of the present disclosure.

Turning now to FIG. 2, an exploded perspective view of an integrated latch mechanism 200 is depicted for a securing and releasing computer equipment from a chassis. In some implementations, a support bracket 220 can include a first lateral structure 222 and a rotating shah 230 secured to the support bracket 220. A sliding plate 260 can be disposed between the support bracket 220 and a mounting bracket 270 in some implementations. The sliding plate 260 includes a latching extension 265 that, in operation, engages and disengages from a computer chassis, such as chassis 190 in FIG. 1. The sliding plate can include one or more slots, such as slots 267 and 269.

A handle 210 can include a rotating end 218 and a second lateral structure 212 disposed at the rotating end 218. The handle 210 is secured at its rotating end 218 to the support bracket 220 about the rotating shaft 230, via hole 215 and a similar hole (not shown) on the other side of the handle 210. The rotating end 218 of the handle 210 also includes one or more nudging extensions 217, 219. In addition, a torsion spring 227 may be disposed about the circumference of the rotating shaft 230. In an assembled state, the torsion spring 227 biases the first lateral structure 222 of the support bracket 220 against the second lateral structure 212 of the handle 210. The biasing causes the handle 210 to rotate or be actuated toward an open position. One or more nudging extensions of the handle 210, such as nudging extensions 217 and 219, engage slots 267, 269 to laterally move the sliding plate 260. In some implementations, the torsion spring may be a double torsion spring.

In some implementation, the support bracket 220 includes one or more wing structures. For example, in some aspects, the first lateral structure 222 of the support bracket 220 may extend between a first wing structure 224 and a second wing structure 226 disposed on the support bracket 220. The first wing structure 224 and second wing structure 226 can be perpendicular to the first lateral structure 222. In some implementations, the rotating shaft 230 has a first end 234 secured to the first wing structure 224, and the second end 236 secured to the second wing structure 226.

In some implementations, the handle 210 includes two elongated sides 211, 213 where the second lateral structure 212 extends between sides 211 and 213. One or both of the elongated sides 211, 213 may include a receiving hole, such as hole 214, for receiving a spring-loaded shaft 240 secured to the support bracket 220. The spring-loaded shaft may include a plunger feature for manually actuating the shaft.

In some implementations, the integrated latch mechanism 200 includes one or more compression springs, such as 251 and 252, for laterally biasing the sliding plate 260, and related latching extension 265 away from the support bracket 220.

Figure 3A:
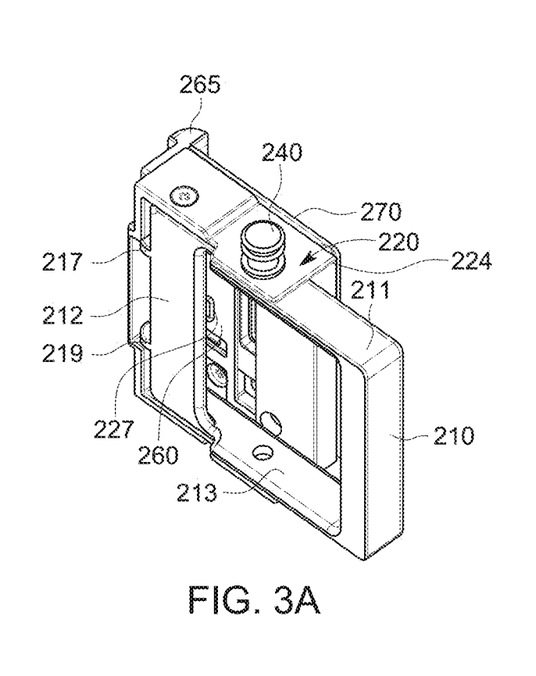
FIG. 3A is a perspective view of the integrated latch mechanism in FIG. 2 with the handle in a closed secured position.
Figure 3B:
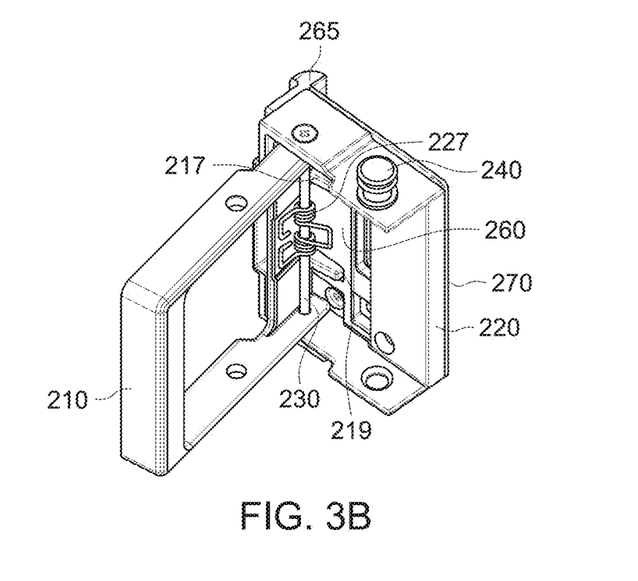
FIG. 3B is a perspective view of the integrated latch mechanism in FIG. 2 with the handle in an open unsecured position.
Figure 4A:
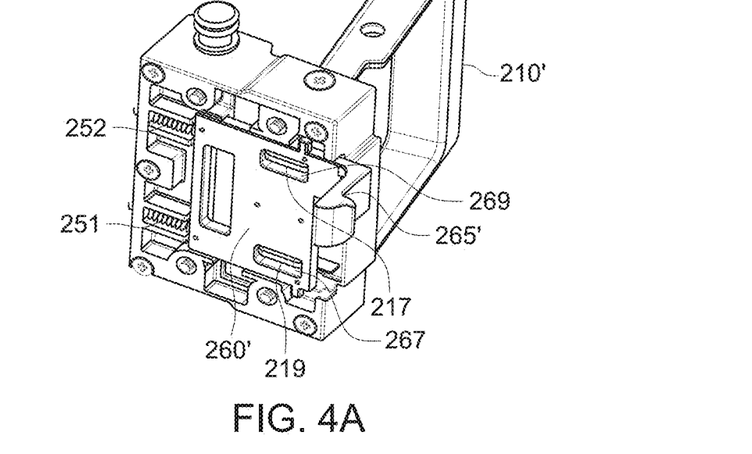
FIG. 4A is another perspective view of the integrated latch mechanism in FIG. 2 with the handle in an open unsecured position.
Figure 4B:
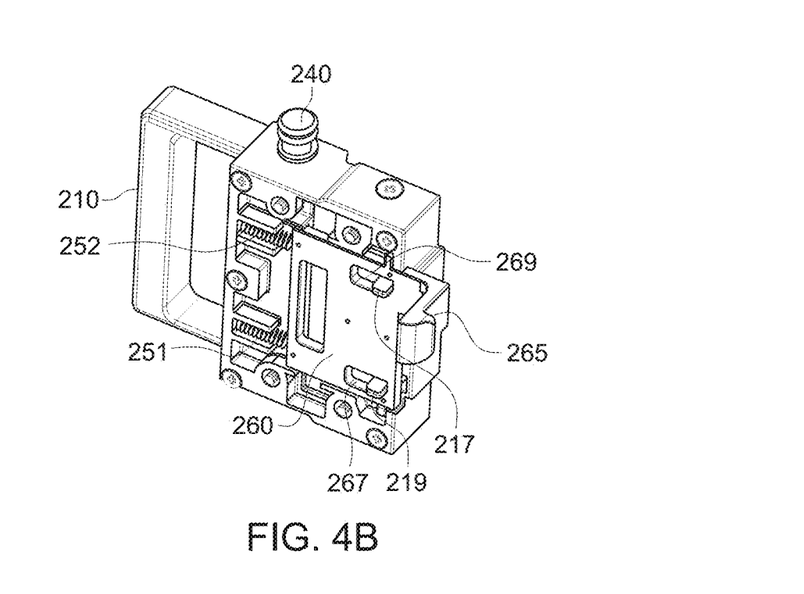
FIG. 4B is an another perspective view of the integrated latch mechanism in FIG. 2 with the handle in a closed secured position.

Turning now to FIGS. 3A-3B and 4A-4B, multiple perspective views of the integrated latch mechanism 200 in FIG. 2 are depicted with the handle in a closed position (the mechanism 200 is secured to a chassis) and in an open position (the mechanism 200 is not secured to the chassis). The closed (secured) position, such as depicted in FIGS. 3A and 4B, refers to the integrate latch mechanism 200 being configured with handle 210 parallel to the sliding plate 260. Furthermore, as the handle is rotated to the closed position from an open position, the latch extension 265 translates parallel to the handle 210, away from the support bracket 220, to engage a computer chassis. The latch extension 265 is depicted generally perpendicular to the sliding plate 260, though it could be in different configurations, such as parallel to the sliding plate or at an angle somewhere there between. The open (unsecured) position, such as depicted in FIGS. 3B and 4A, refers to the integrated latch mechanism 200 being positioned where the handle 210' is perpendicular or near-perpendicular to the sliding plate (e.g., about 60 to about 120 degrees; about 70 to about 110 degrees; about 80 to about 100 degrees), and the latch extension 265 being positioned where it has disengaged from a computer chassis by translating laterally in the opposite direction toward the support bracket 220, as depicted in FIGS. 3A and 4B.

In some implementations, when the handle 210' is in an open position, the torsion spring 227 is extended toward an equilibrium state (see FIG. 3B). When the handle 210 is disposed in a closed position, the torsion spring 227 is biased toward a fully compressed state (see FIG. 3A).

The handle 210 can include one or more nudging extensions, such as nudging extensions 217 and 219 that, in an assembled state, engage slots 267, 269 and laterally move the sliding plate 260, or allow the plate 260 to move, when the handle 210 is rotated from the open position to the closed position, or from the closed position to the open position. For example, the nudging extension(s) move or facilitate movement of the latching extension 265 away from the support bracket 220 to engage the chassis as the handle 210 is rotated from the open position to the closed position.

In some implementations, a spring-loaded shall 240 is secured to support bracket 220 that is positioned to engage a hole 214 in the handle 210 when the handle is in the closed position, with the shaft locking the handle 210 into the closed position. The spring-loaded shaft 240 can then be pulled out or away from the support bracket, using for example, a plunger mechanism attached to the end of the shaft. By pulling the spring-loaded shaft 240 in a manner that compresses the spring, the shaft exits the hole 214 and disengages from the handle 210. This unlocks the handle 210 and allows it to be rotated to an open position.

In the example of FIG. 3B, a perspective view of the integrated latch mechanism in FIG. 2 is depicted with the handle in the open, unsecured position. When the handle 210' is in an open position, the torsion spring 227 is extended toward an equilibrium state. When the handle 210 is disposed in a closed position, the torsion spring 227 is biased toward a fully compressed state. The handle includes one or more nudging extensions, such as nudging extensions 217 and 219 that, in an assembled state, engage slots 267, 269 and laterally move the sliding plate 260 when the handle is rotated from the open position to the closed position. The latching extension is moved, or caused to be moved (e.g., via a spring), away from the support bracket to engage the chassis as the handle is rotated to the closed position.

In the example of FIG. 4A, another perspective view of the integrated latch mechanism 200 in FIG. 2 is depicted with the handle in an open unsecured position and with mounting plate 270 (see FIG. 3B) removed. Relatedly, in FIG. 4B, a further perspective view of the integrated latch mechanism 200 in FIG. 2 is depicted with the handle 210 in a closed secure position and also, with the mounting bracket 270 removed.

Figure 5A:
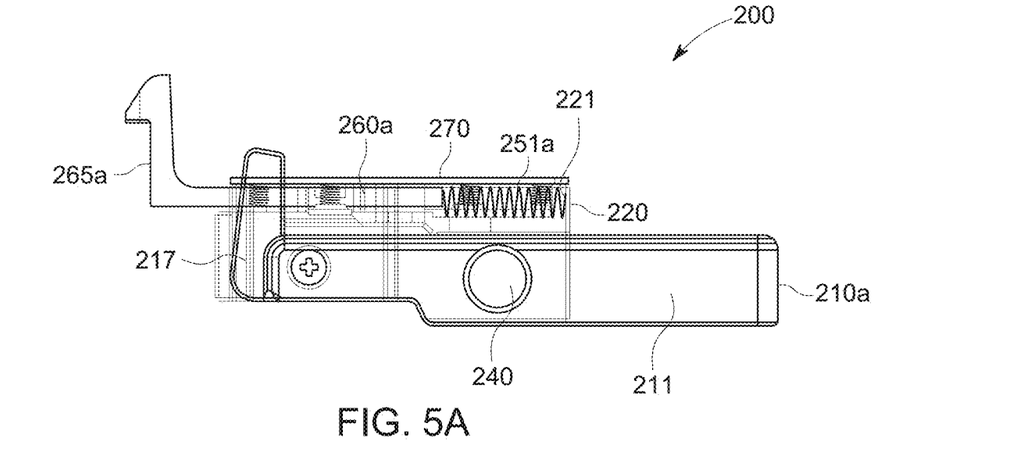
FIG. 5A is a side view of the integrated latch mechanism in FIG. 2, which is depicted with the handle in a closed position with a support bracket for the integrated latch mechanism illustrated with transparent lines.

Turning now to FIG. 5A, a side view of the integrated latch mechanism 200 in FIG. 2 is depicted with the handle 210a in a closed position with a support bracket 220 for the integrated latch mechanism 200 illustrated with transparent lines. In the closed position, the handle 210a is parallel to the support bracket 220 and a mounting bracket 270. Furthermore, the handle 210a is locked in place via the spring-loaded shaft that penetrates a receiving hole in side arm 211 of the handle 210a. By lifting or pulling a plunger of the spring-load shaft, the shaft portion exits the receiving hole, thereby allowing the handle 210a to be rotatable about rotating shaft 230 (see FIG. 2). In the closed position for the integrated latch mechanism 200, the latch extension 265a is at its furthest position away from the support bracket 220, where the integrated latch mechanism 200 would be engaged with the computer chassis. Nudging extension 217 is also engaged with the mounting bracket 270 with compression spring 251a in an extended position biasing the latch extension 265a, via the sliding plate 260a, away from the support bracket 240. The compression spring 251a is connected at one end to a back wall 221 of the support bracket 220 and at the other end to the sliding plate 260a.

Figure 5B:
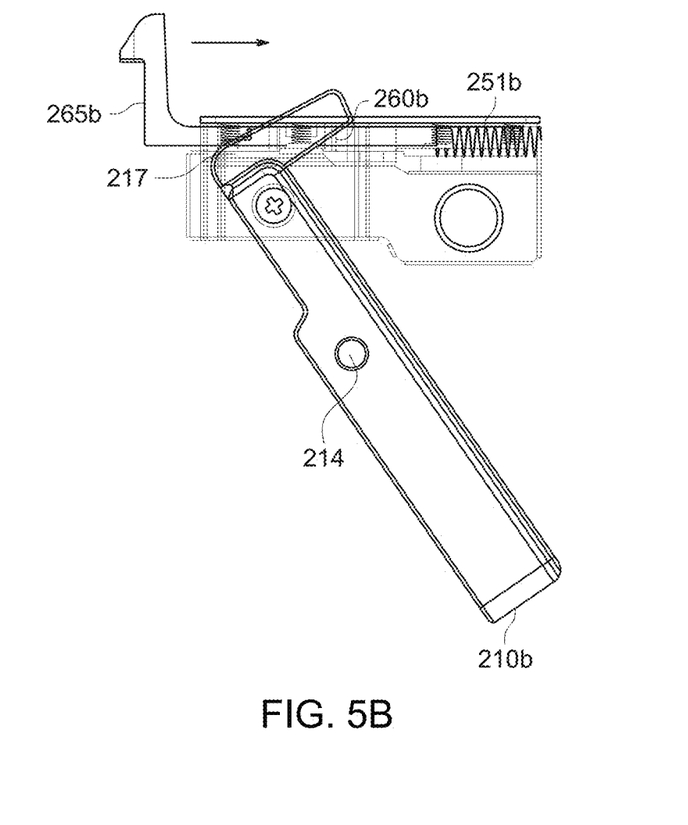
FIG. 5B is a side view of the integrated latch mechanism of FIG. 5A with the handle rotating from the closed position to an open position.
Figure 5C:
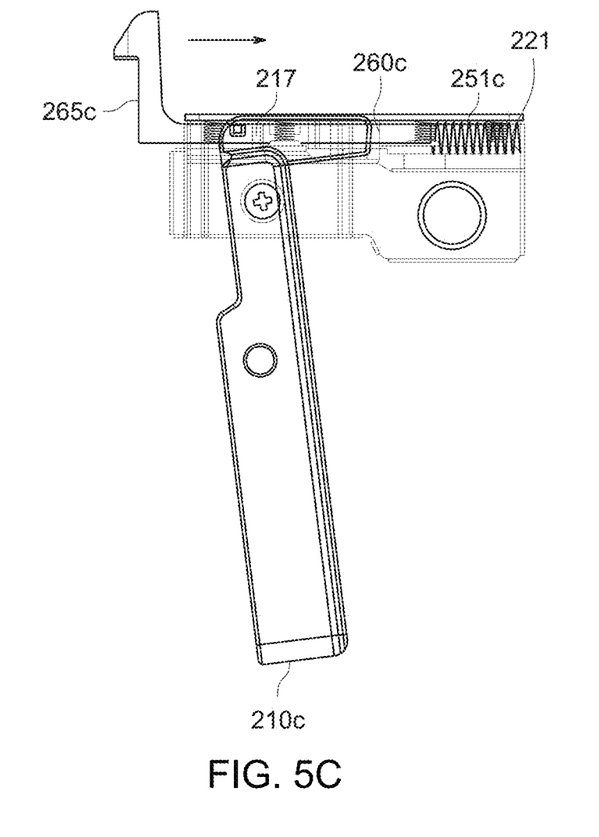
FIG. 5C is a side view of the integrated latch mechanism of FIG. 5A with the handle fully rotated to the open position.

Referring to FIG. 5B, a side view of the integrated latch mechanism 200 in FIG. 5A is depicted with the handle 210b being in an intermediate position as the handle is rotated from the closed position as depicted by handle 210a in FIG. 5A, to an open position as the handle 210c is depicted in FIG. 5C. Once handle 210b has reached its intermediate position, latch extension 265b has already translated closer to support bracket 220 (in FIG. 5A) as sliding plate 260b is translated via nudging extension 217 to the right or closer to the center of the support bracket. Simultaneously, compression spring 251b compresses as it continues to bias sliding plate 260b in the opposite direction, where such biasing is countered by the force imparted to the sliding plate 260b via the rotation of handle 210b.

Referring to FIG. 5C, a side view of the integrated latch mechanism 200 in FIG. 5A is depicted with the handle 210c fully rotated to the open position. The handle 210c is depicted in a near perpendicular position relative to the sliding plate 260c, which has translated further to the right, closer to the center of the support bracket. In addition, the latch extension 265c is now also closer to the support bracket as the latching extension 265c would now be fully disengaged from a computer chassis. In addition, the compression spring would be further compressed between the sliding plate 260c and back wall 221 of the support bracket 220 (in FIG. 5A).

Figure 6:
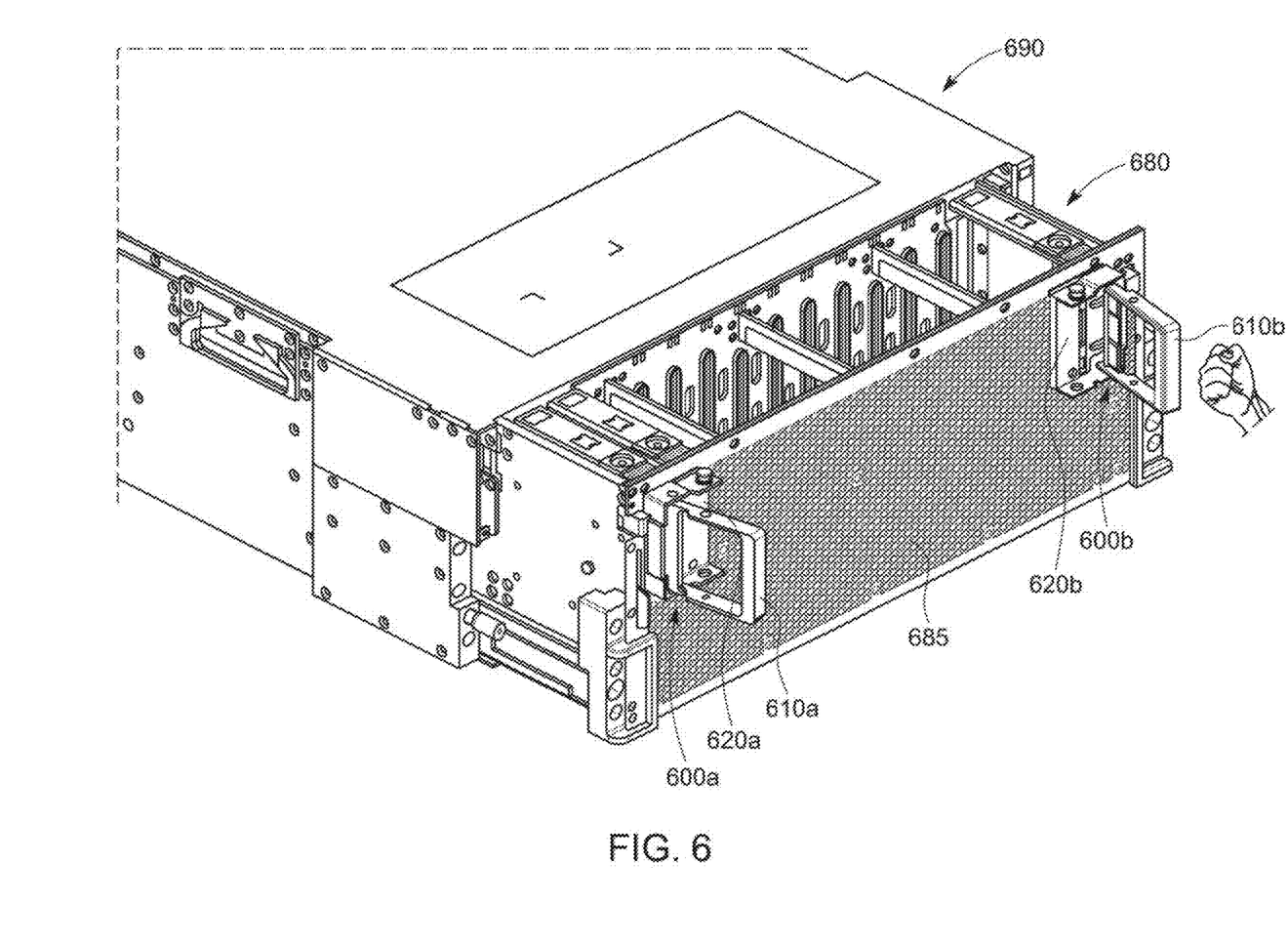
FIG. 6 is a perspective view of the integrated latch mechanism in an open position unsecured from a chassis to allow the rackmount equipment to be removed.

Turning now to FIG. 6, a perspective view of integrated latch mechanisms 600a, 600b are depicted fixed to a piece of computer equipment 680 with the integrated latch mechanisms 600a, 600b in an open position, unsecured from a chassis 690, to allow displacement of the rackmount computer equipment 680. The computer equipment 680 is partially disposed within the chassis 690, where the computer equipment 680 is effectively in an intermediate stage of either being slid into or out of the chassis 690. The integrated latch mechanisms 600a, 600b are particular desirable because the handles 610a, 610b allow a technician to easily push or pull computer equipment 680 that is at least partially disposed in the chassis 690 in addition to quickly securing and unsecuring the integrated latch mechanism 600a, 600b to and from the chassis 690. Handles 610a, 610b also depict an exemplary aspect of handles being perpendicular or near perpendicular to a front cover 685 of the computer equipment 680 and support brackets 620a, 620b when in an open position.

Figure 7:
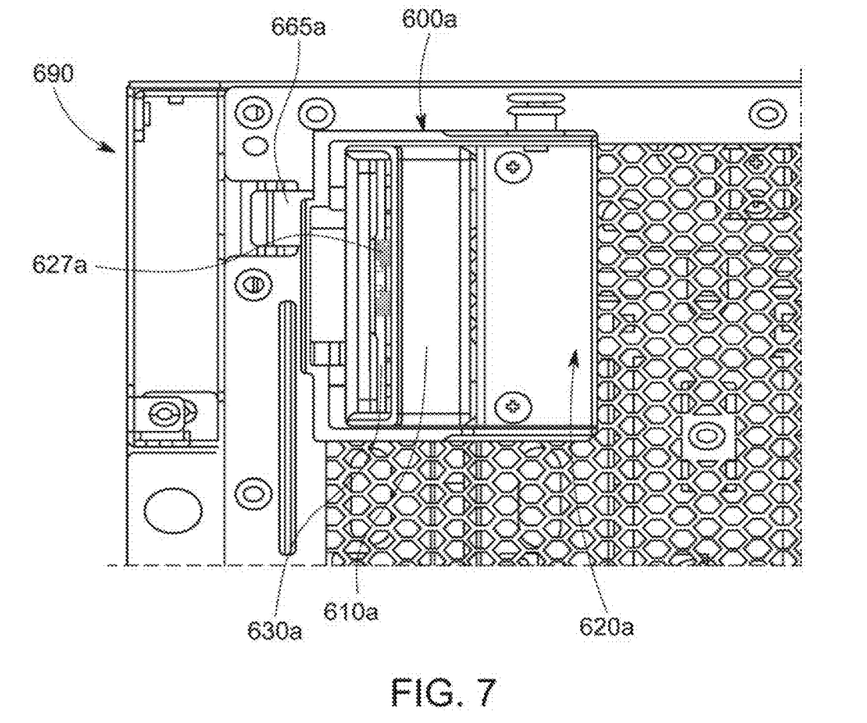
FIG. 7 is a close-up front view of one of the integrated latch mechanisms in FIG. 6 with the handle in the open position.

Referring to FIG. 7, a close-up front view of integrated latch mechanism 600a from FIG. 6 is depicted with the handle 610a in the open position. The handle is secured to the support bracket 620a by way of the rotating shaft 630. Torsion spring 627a is disposed on rotating shaft 630a. The latch extension 665a does not engage the chassis 690 and rather allows the computer equipment to be displaced.

Figure 8:
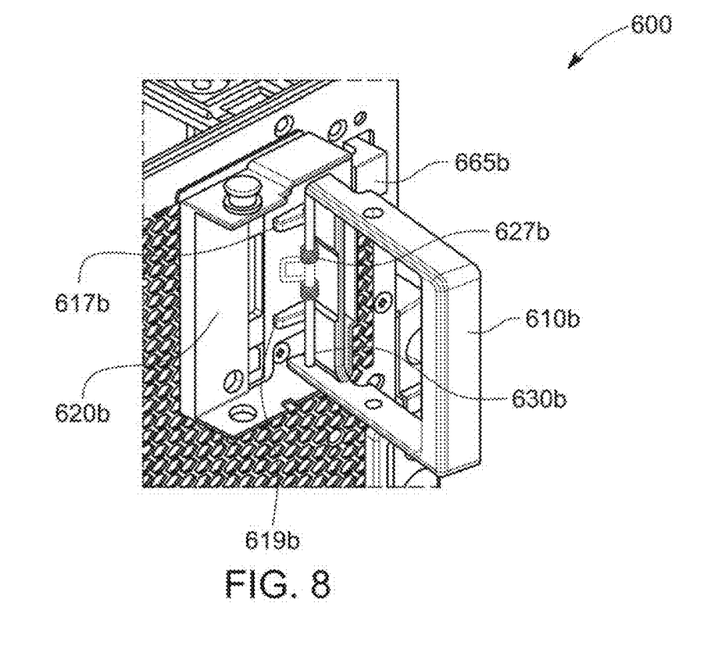
FIG. 8 is a close-up perspective view of the other integrated latch mechanism in FIG. 6 with the handle in the open position.

Turning now to FIG. 8, a close-up perspective view of the other integrated latch mechanism in FIG. 6, integrated latch mechanism 600b, is depicted with the handle 610b in the open position. Similar to integrated latch mechanism 600a, a handle 610b is secured to the support bracket 620b by way of the rotating shaft 630b, which has torsion spring 627b disposed around the shaft circumference. The latch extension 665b does not engage the chassis 690 and rather allows the computer equipment to be displaced. Nudging extensions 617b, 619b are in an exemplary position that would be expected for the handle 610b in the open position.

Figure 9:
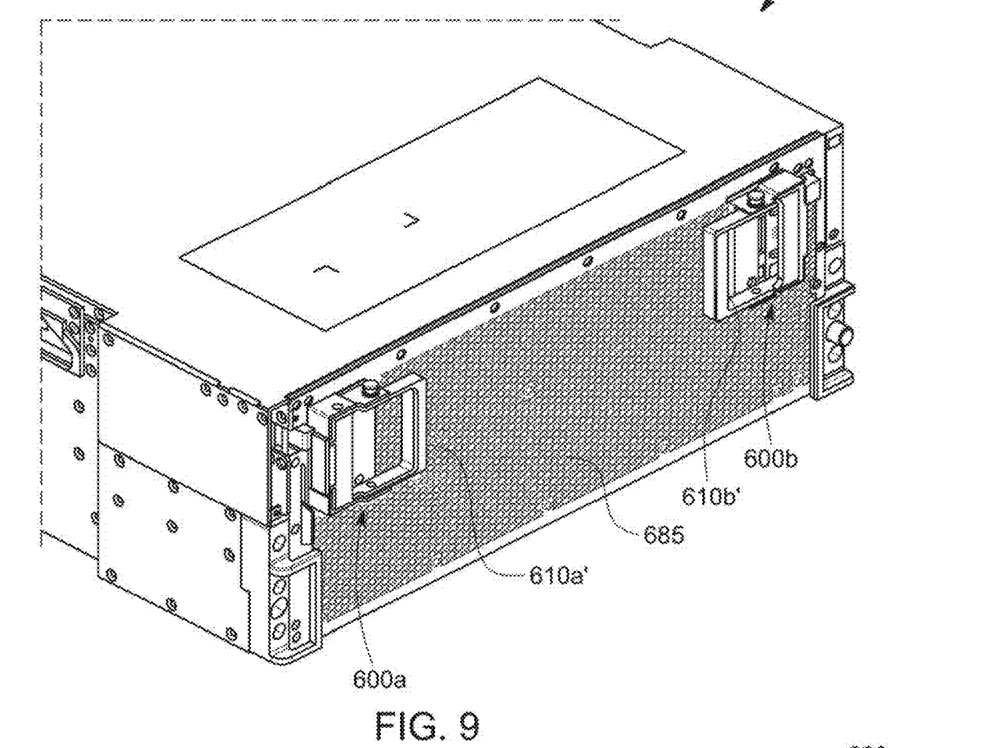
FIG. 9 is a perspective view of an integrated latch mechanism with the handle in a closed position to secure the rackmount equipment in the chassis.

Turning now to FIG. 9, a perspective view of integrated latch mechanisms 600a, 600b from FIGS. 6-8 are depicted with the handles 610a', 610b' of corresponding closed integrated latch mechanisms 600a', 600b' in a closed position to secure equipment 680 (in FIG. 6) in the chassis 690, The computer equipment 680 is fully disposed within the chassis 690, where the computer equipment 680 has effectively been fully slid into the chassis 690. The integrated latch mechanisms 600a, 600b are particular desirable because the handles 610a', 610b' allow a technician easily push computer equipment 680 into the chassis 690 from the intermediate position of FIG. 6, in addition to quickly securing the integrated latch mechanism 600a, 600b to the chassis 690. Handles 610a', 610b' also depict an exemplary aspect of handles being parallel near parallel to a front cover 665 of the computer equipment 680 and support brackets 620a, 620b when in the closed position.

Figure 10:
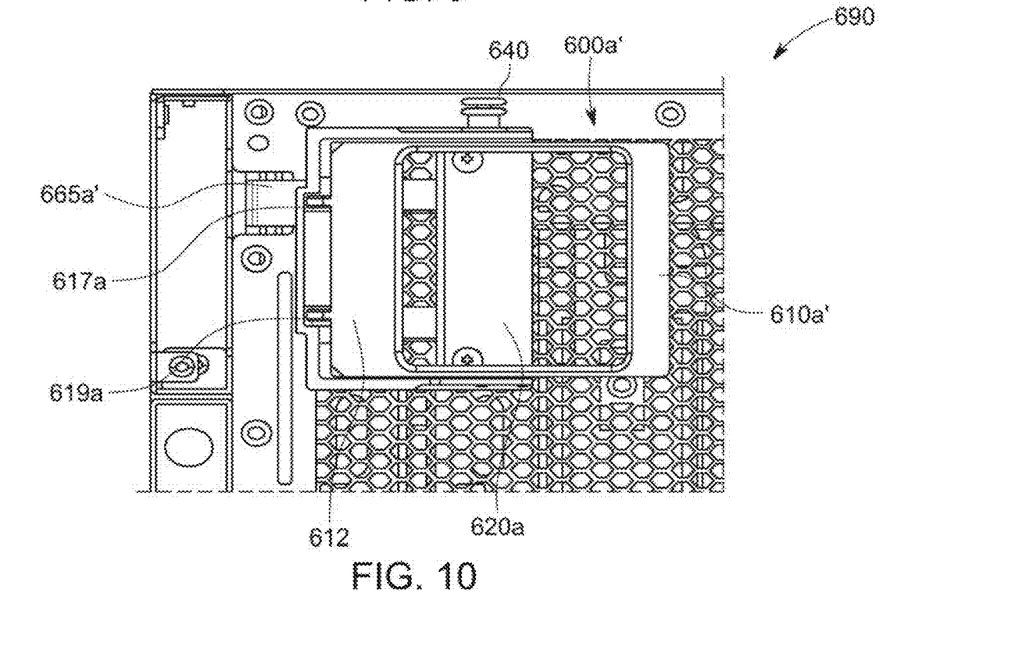
FIG. 10 is a close-up front view of one of the integrated latch mechanisms in FIG. 9.

Turning now to FIG. 10, a close-up front view of the exemplary integrated latch mechanism 600a from FIG. 9 is depicted with the handle 610a' in the closed position. The handle 610a' is secured to the support bracket 620a by way of the rotating shaft that is hidden behind handle lateral support 612 in FIG. 10. Nudging extensions 617a, 619a are in an exemplary position that would be expected for the handle 610a in the closed position. With the handle 610a' in the closed position, the nudging extensions 617a, 619a have engaged the sliding plate disposed below the support bracket 620 to move latch extension 665a' away from the support bracket, in a direction generally parallel with the handle 610a' and the front cover of the computer equipment 680. The latch extension 665a' is shown as engaging the computer chassis in FIG. 10.

While various embodiments of the present invention have been described above, it should be understood that they have been presented by way of example only, and not limitation. Numerous changes to the disclosed embodiments can be made in accordance with the disclosure herein without departing from the spirit or scope. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous tsar any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. An integrated latch apparatus for securing and releasing computer equipment from a chassis, the apparatus comprising:
   a support bracket including a first lateral structure;
   a mounting bracket secured to the support bracket;
   a rotating shaft secured to the support bracket;
   a sliding plate including a latching extension, the sliding plate being disposed between the support bracket and the mounting bracket;

a handle including a second lateral structure at a rotating end of the handle, the handle secured at the rotating end to the support bracket about the rotating shaft, the rotating end of the handle including one or more nudging extensions;

a torsion spring disposed on the rotating shaft such that the torsion spring biases the first lateral structure of the support bracket against the second lateral structure of the handle such that the handle is in an open position when the torsion spring is extended toward an equilibrium state and in a closed position when the torsion spring is biased toward a fully compressed state; and a pair of compression springs positioned between the sliding plate and the support bracket such that the compression springs bias the latching extension of the sliding plate away from the support bracket such that the handle is in a closed position when the compression springs are extended toward an equilibrium state and in an open position when the compression springs are biased toward a fully compressed state, wherein the one or more nudging extensions of the handle directly engage the sliding plate through one or more corresponding slots in the sliding plate to laterally move the sliding plate when the handle is rotated from the open position to the closed position, thereby moving the latching extension away from the support bracket to engage the chassis as the handle is rotated to the closed position, the one or more corresponding slots being through-holes, wherein rotating the handle from the open position to the closed position causes the one or more nudging extensions to extend past the sliding plate, wherein the one or more nudging extensions do not extend past the sliding plate while the handle is in the open position.

2. The integrated latch apparatus of claim 1, wherein the one or more nudging extensions of the handle engage and laterally move the sliding plate in an opposite direction toward the support bracket when the handle is rotated from the closed position to the open position, thereby disengaging the latching extension from the chassis as the handle is rotated to the open position.

3. The integrated latch apparatus of claim 1, wherein the latching extension extends in a first direction perpendicular to a remainder of the sliding plate, wherein a portion of the latching extension that engages the chassis is laterally spaced from a remainder of the sliding plate along a first direction perpendicular to a plane formed by the remainder of the sliding plate.

4. The integrated latch apparatus of claim 1, wherein rotating the handle from the open position to the closed position causes the one or more nudging extensions to extend past the sliding plate and into one or more corresponding slots in the mounting bracket, wherein the one or more nudging extensions do not extend into the one or more slots in the mounting bracket or past the sliding plate while the handle is in the open position.

5. The integrated latch apparatus of claim 4, wherein rotating the handle from the open position to the closed position causes the one or more nudging extensions to extend past the sliding plate through the one or more slots in the sliding plate, wherein the one or more slots in the mounting bracket are parallel to and align with the one or more slots in the sliding plate.

6. The integrated latch apparatus of claim 4, wherein the mounting bracket is directly mounted to a front cover of the computer equipment.

7. The integrated latch apparatus of claim 4, wherein the handle is substantially parallel to the sliding plate, the support bracket, and the mounting bracket when the handle is in the closed position.

8. The integrated latch apparatus of claim 4, wherein the one or more slots in the mounting bracket are the same shape as the one or more slots in the sliding plate.

9. The integrated latch apparatus of claim 1, wherein when the handle is positioned in the open position, the handle is operable for sliding the computer equipment in and out of a chassis disposed in a rack.

10. The integrated latch apparatus of claim 1, wherein the handle includes at least two nudging extensions, wherein the one or more corresponding slots in the sliding plate includes at least two corresponding slots, wherein the at least two nudging extensions extend past the sliding plate through the at least two corresponding slots in the sliding plate while the handle is in the closed position.

11. The integrated latch apparatus of claim 1, wherein the first lateral structure extends between a first wing structure and a second wing structure disposed on the support bracket.

12. The integrated latch apparatus of claim 11, wherein the first wing structure and second wing structure are both perpendicular to the first lateral structure.

13. The integrated latch apparatus of claim 11, wherein the rotating shaft has a first end and a second end, the first end secured to the first wing structure and the second end secured to the second wing structure.

14. The integrated latch apparatus of claim 1, wherein the handle includes two elongated sides, a first end of each of the two elongated sides being coupled directly to the handle, wherein the two elongated sides extend perpendicular to the handle, wherein the second lateral structure is coupled directly to a second end of each of the two elongated sides and positioned between the two elongated sides, wherein the one or more nudging extensions and the rotating end of the handle are orthogonal to each other from the rotating shaft.

15. The integrated latch apparatus of claim 14, wherein a continuous outer edge is formed by the handle, the two elongated sides, and the second lateral structure, wherein the continuous outer edge encloses a void.

16. The integrated latch apparatus of claim 1, further comprising a spring-loaded shaft secured to the support bracket for engaging a hole in the handle when the handle is in the closed position, thereby locking the handle in the closed position.

17. The integrated latch apparatus of claim 16, wherein the spring-loaded shaft is configured to disengage with the hole in the handle when a spring in the spring-loaded shaft is compressed, thereby unlocking and allowing the handle to be rotated to an open position.

18. The integrated latch apparatus of claim 1, wherein the handle is substantially perpendicular to the sliding plate when the handle is in the open position.

19. The integrated latch apparatus of claim 1, wherein the latching extension is substantially perpendicular to the sliding plate.

20. The integrated latch apparatus of claim 1, wherein the one or more nudging extensions engage the sliding plate without protruding from the sliding plate at the one or more corresponding slots when in the open position.

21. The integrated latch apparatus of claim 1, wherein the one or more slots in the sliding plate includes more than one slot, wherein each of the slots in the sliding plate are parallel to each other, wherein the latching extension is at a furthest position away from the support bracket while the handle is in the closed position.

\* \* \* \* \*